Figure 3:
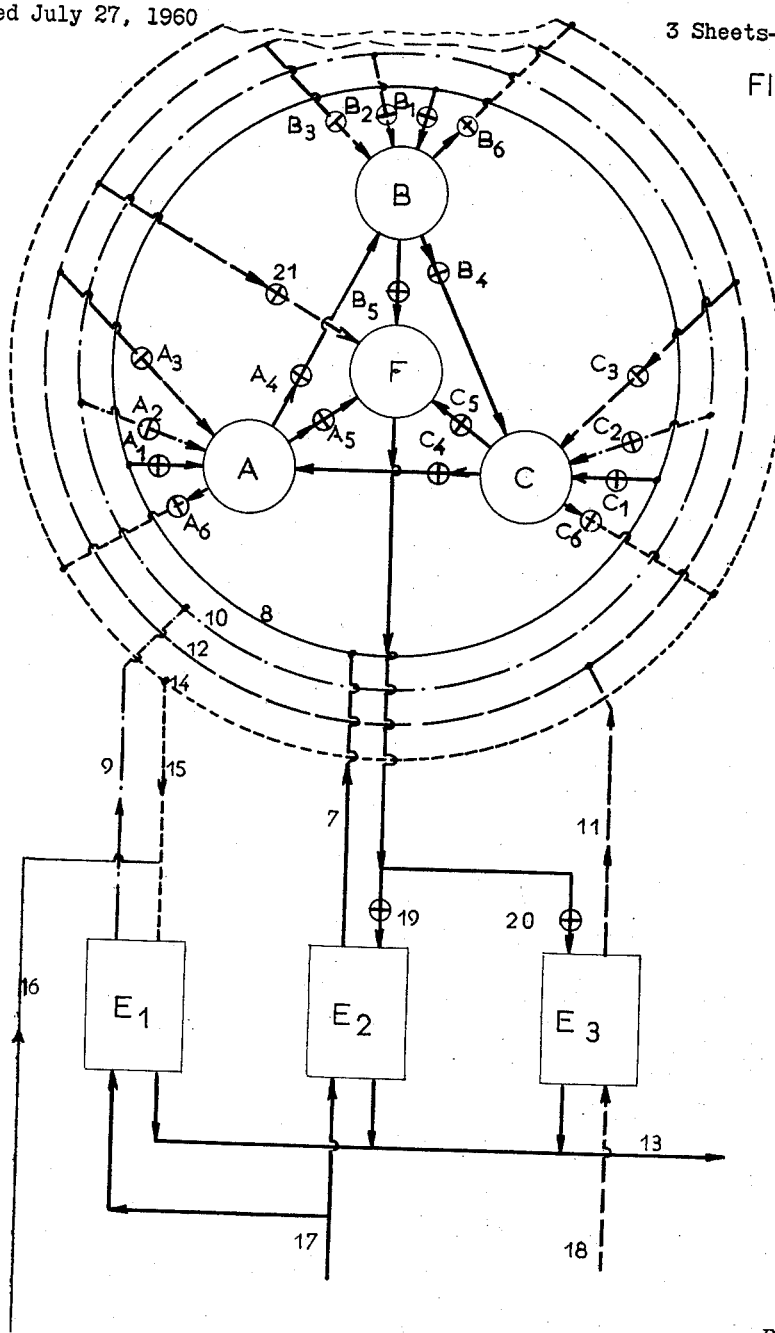

June 18, 1963  C. CLEMENT ET AL  3,094,410
PROCESS FOR REDUCING IRON ORES
Filed July 27, 1960  3 Sheets-Sheet 1
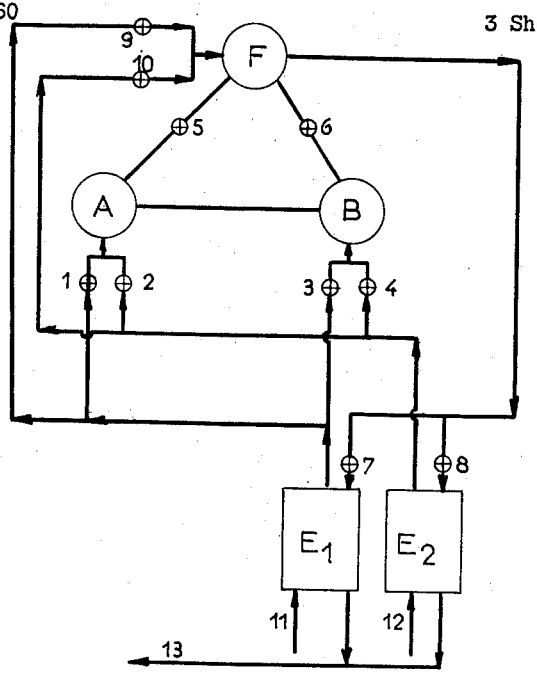
FIG. 1
FIG. 2
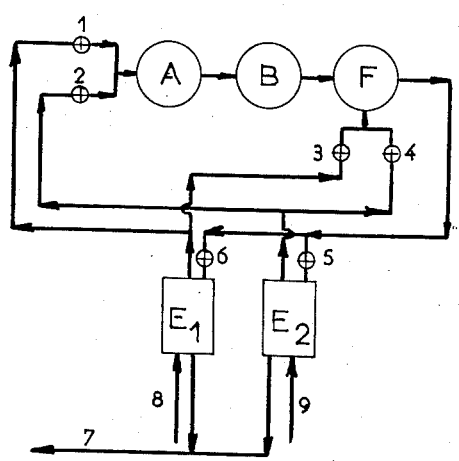
INVENTORS
CLAUDE CLEMENT
FRANÇOIS ESCHARD
MICHEL VIGUIER
BY *Toulmin & Toulmin*
ATTORNEYS United States Patent Office 3,094,410
Patented June 18, 1963

3,094,410
PROCESS FOR REDUCING IRON ORES
Claude Clement, Bagneux, François Eschard, Croissy-sur-Seine, and Michel Viguier, Paris, France, assignors to Institut Français du Petrole des Carburants et Lubrifiants, Paris, France
Filed July 27, 1960, Ser. No. 45,610
Claims priority, application France July 31, 1959
13 Claims. (Cl. 75—40)

The present invention relates to a continuous process for reducing iron ores in the liquid state by means of a gaseous reducing agent.

According to the known processes the reduction of iron ores is carried out in blast furnaces at great cost due to the fact that coke of the metallurgical quality is used, both as reducing and as heating agent, and that the relatively low spatial velocity of the reactants results in an insufficient output level or otherwise requires the use of installations of a very great size which, in turn, leads to high investment and amortization costs.

Some of these drawbacks may be avoided by using reducing agents which are much more economical and particularly gaseous reducing agents such as hydrogen, carbon oxide, gases produced by a generator or natural gas, as well as hydrocarbon vapors. Among these various gaseous reducing agents natural gas is generally considered to be the most interesting in view of its very low cost in the producing areas and the favorable conditions for its transportation and utilization.

However, up to now the complete conversion of iron ore to iron in a continuous manner has not been carried out by using exclusively natural gas as a reducing agent.

The use of natural gas has been limited to a preliminary treatment of iron ore in the solid state, followed by a melting step so as to obtain cast iron or liquid iron. The treatment of the iron ore in a solid, finely divided state with a gaseous reducing agent results in the formation of an iron sponge which cannot be used as such and must be smelted in any case at a temperature of about 1500° C. Furthermore, such a treatment suffers from the drawback of resulting in the production of iron which still contains a considerable proportion (of about 5 to 10 percent) of non-reduced iron ore, which proportion must be tolerated for economical reasons in view of the fact that the reducing process slows down progressively as the iron content of the mixture increases, which results in a very high cost of reduction of the ultimate fractions of iron ore contained therein.

It is, therefore, almost impossible to obtain in this way substantially pure iron under economically acceptable conditions without carrying out a further reducing step concomitant with or subsequent to the smelting of the iron sponge.

Moreover, such a smelting step at a temperature of about 1500° C. cannot be carried out by directly contacting the iron sponge with the flame obtained by ignition of natural gas, since a reaction between the reduced iron and the oxidizing gases would occur, resulting in a re-oxidation of the iron. Consequently, it will be necessary to use indirect heating means, such as electrical ones, or to heat by means of a flame, through a wall or the slag, in order to achieve said smelting, which processes, due to the high temperatures required, involve the necessity of solving very difficult technical problems.

Furthermore, indirect heating techniques always imply higher costs resulting either from the supplemental cost for the conversion of thermal energy to electricity and the relatively low yield of the latter, or from the low yield of heat transmission through walls which requires a heating of the latter at such high temperatures that they will soon deteriorate.

If iron or steel free from iron-oxides are to be obtained, it is necessary to carry out a further reduction step concomitant with or subsequent to the smelting, in the absence of substantial amounts of gases capable of reoxidizing the iron, such as air, which preferably requires the use of indirect heating means.

Consequently, it is apparent that the reduction of iron ores in the solid state, even when completed in a further reducing step in the liquid state, suffers not only from the above-mentioned drawbacks but also from that resulting from the low velocity of the reaction of reduction of solid iron oxides.

It is, therefore, an object of our invention to provide a process for carrying out a reduction of iron ores which does not require the use of costly installations and does not result in high amortization costs.

It is another object of the present invention to carry out the reduction of iron ores in the liquid state.

It is a further object of the present invention to provide a reduction of iron ores or oxides in the liquid state by means of a gaseous reducing agent.

It is still a further object of the present invention to carry out the reduction of iron ores or oxides in the liquid phase by use of natural gas, in relatively low amounts, as a reducing agent.

It is yet another object of the present invention to convert iron ores or oxides to iron on an industrial scale with very high conversion velocities, so as to obtain an iron output per volume unit of the reaction vessel which is considerably higher than that obtained in the conventional process of reducing iron ore or oxide in the solid state.

These and other objects as may be apparent from the following specification are achieved according to our invention in a two-stage process for continuously treating the iron ores in the liquid phase by means of gaseous reducing agents.

The iron ore to be submitted to this two-stage process is previously brought to its smelting point, which may be achieved by directly contacting the latter with a flame resulting from a complete combustion of gases, solids and/or liquids. Accordingly, it is possible to substantially reduce the amount of heat required during the subsequent reducing steps and, due to the high temperature and the resulting liquid state of the iron ore, to considerably improve the output velocity per volume unit of the reaction vessel. The reducing steps are thereafter carried out in the liquid state.

Up to now the reduction of iron ores in the liquid state has never been carried out on an industrial scale due to the excessive amount of reducing gases required therefor.

Some attempts have already been made in view of reducing the amount of gases required for carrying out the treatment of iron ores in the solid state in a continuous process, by recycling the non-reacted parts of the reducing gases. However, such a recycling is of no advantage in case iron ores in the liquid state have to be treated, since it would require the separation of carbonic gas and water from the gaseous flow recovered at the outlet of the reaction vessel, in order to restrict the recycling to such gases which still possess a reducing power, i.e. essentially to carbon monoxide and hydrogen. Moreover, such a separation must be carried out by an intense cooling of the gaseous flow issued from the reaction vessel, so as to bring it to a temperature at which said constituents can be separated, followed by a treatment at this temperature for removing the oxidized gases (carbonic gas and water) and thereafter by a re-treatment of the remaining reducing gases in order to bring them again to the reaction temperature in view of their recycling into the reaction vessel.

However, if the cooling of the gaseous flow issued from the reaction vessel, in view of the recycling of the remaining reducing gases, may be of advantage in case the reduction of iron ores is carried out in the solid state at relatively low temperatures, this is not so when the reduction is carried out in the liquid state, since the very high operating temperatures applied would require a substantial supplemental consumption of reducing gases to bring the remaining reducing gases after separation back to the reaction temperature.

Nevertheless, according to our invention a low consumption of reducing gases is attained in a process of reducing iron ores in the liquid state in two successive stages without recycling the reducing gases and an intermediary separation step requiring cooling of said gases followed by a reheating of the same.

The oxidation degree of the iron ore or oxide being defined as the ratio of the number of oxygen atoms to the number of iron atoms, in a combined form, contained in the iron ore, the first stage of our process consists in reducing said oxidation degree of the iron ore or oxide to a value comprised between 0.7 and 1.2 and, when treating a substantially pure iron oxide, preferably between 1.01 and 1.10 so as to avoid any substantial formation of iron during this stage, whereas, when treating a gangue-containing iron ore, the preferred range of the oxidation degree, in the case where each stage is carried out in one single step, is of from 0.75 to 1.10. The oxidation degree of the iron ore may be measured by any known method of dosage of iron oxides such as, for example, by dissolving the latter in hydrochloric acid, dosing ferrous ions by means of potassium permanganate, thereafter reducing ferric ions and dosing the total quantity of iron contained in the iron ore in the form of ferrous ions (see Darken and Gurry, Journal of the American Chemical Society 67, 1398 (1945), and 68, 798 (1946).

Any other known method, such as physical methods using X-rays, may as well be employed for determining said oxidation degree.

It is the object of the second stage of our process to convert the partially reduced iron ore or oxide, already obtained at the end of the first stage, into iron.

Each of these two stages of our process may be carried out in one or more steps consisting of bringing into contact liquid iron oxide with reducing gases, preferably by bubbling the latter through the former.

Essential features of our invention are to provide for a continuous decrease, during each of said steps, of the average oxidation degree of the iron ore and to apply partially oxidized gases recovered at the end of certain given steps, for carrying out the reduction, in concomitant steps, of iron ores or oxides of a higher oxidation degree than that of the iron ores or oxides treated in said given steps.

The continuous decrease of the oxidation degree of the liquid reactant, obtained according to this invention, results in the best possible use of the reducing power of gases, particularly when carrying out the process in many steps, which is an important advantage of said process as compared with the prior art.

It is, however, not necessary for carrying out this invention that the same reducing gases pass successively throughout each of the reaction vessels wherein are carried out the different reducing steps, when more than two steps are used, but at least two reducing steps must be carried out by using the same stream of reducing gases.

According to a first, preferred, embodiment of the process of our invention, an iron ore or oxide of a given oxidation degree is treated in a first reaction vessel with partially oxidized gases issued from a second reaction vessel containing an iron ore or oxide of a lower oxidation degree. When the partial reduction of the iron ore or oxide contained in said first reaction vessel is achieved, another reducing gas of a higher reducing power than the former and, for instance, fresh reducing gas is supplied thereto, whereas the reducing gases issuing therefrom are supplied to another reaction vessel for carrying out the reduction of an iron ore or oxide of a higher oxidation degree, contained therein.

As soon as the iron ore or oxide contained in said first reaction vessel is entirely converted to iron, which may be achieved at the end of the second step, the resulting liquid iron is withdrawn from said reaction vessel and replaced by non-treated iron ore of the initial oxidation degree.

According to this embodiment of our invention at least two successive reducing steps are carried out in the same reaction vessel.

According to a second embodiment of the process of our invention the same first reaction vessel may be used for carrying out one single reducing step, the partially reduced iron ore obtained at the end of this step then being transferred to another reaction vessel wherein a further reducing step is carried out by means of reducing gas of higher reducing power, for instance fresh reducing gas, whereas a new charge of iron ore or oxide is treated in said first reaction vessel for carrying out the same reducing step. In each reaction vessel there is thus performed the same reducing step and in a two-step process the first reaction vessel is always fed with partially oxidized gases issued from the second reaction vessel.

In both cases, whatever may be the type of embodiment according to which is carried out the process of our invention, it is always possible to use no more than two reaction vssels containing iron ores or oxides of different oxidation degrees, fed successively with the same reducing gas, and to carry out other reducing steps in one or more further reaction vessels by means of fresh reducing gas or gas issuing from any reaction vessel, provided that it still possesses a sufficient reducing power.

The above-described process may be applied for treating either very pure iron ores consisting substantially exclusively of iron compounds or iron ores, further containing a gangue consisting of various oxides and, in most cases, of silica, alumina, lime, phosphoric anhydride, magnesia and the like.

However, in the treatment of gangue-containing ores, it will be convenient to add thereto a flux of the conventional type, the acidic or basic nature of which is selected according to the composition of the gangue.

"Reducing gas" according to our invention is intended to designate any gas capable of reducing the oxidation degree of the liquid iron ore and particularly carbon monoxide, hydrogen, hydrocarbons in the form of gases or vapors, said reducing gases being used as such or in admixture with another one, or admixed with gases or vapors which are inert with respect to iron oxide and/or iron.

Among such reducing gases are to be mentioned particularly natural gas, coke-oven gas, water-gas, generator gas and the like.

Said gases may also contain a certain proportion of carbonic gas or of steam, but this proportion must always be kept lower than that which would result in the nullification of the reducing power of the gas with respect to iron ore. Such a proportion may be determined on the basis of diagrams representative of the equilibrium between iron and its oxides and other derivatives on one hand and reducing gases, $CO$ and $H_2$ on the other hand. Thus, if it is desired to convert iron oxide into iron, substantially quantitatively, in the presence of a gangue, there may be tolerated only traces of $CO_2$ and/or $H_2O$ in the gases issued from the reaction vessels and particularly from that in which is carried out the ultimate reduction step. Consequently, in this case it is more advantageous to use hydrocarbons in the form of either gases or vapors as reducing agents.

On the other hand, in the absence of gangue, the same conversion may be carried out by means of reducing gases still containing a significant amount of $CO_2$ and/or $H_2O$.

In any case it may be acceptable to use in a given step of the process a reducing gas having a higher content of $CO_2$ and/or $H_2O$ than that required for the reducing gas used in a subsequent step. Such a possibility is of particular interest, since it permits to add a certain amount of oxygen or of an oxygen-containing gas, such as air, to a reducing gas substantially free from $CO_2$ and/or $H_2O$, so as to achieve a controlled combustion of one part of the same, thereby providing for a supplemental calory supply as required by the endothermic character of the reaction.

This controlled combustion will lead to the formation of either a certain quantity of $CO_2$ and $H_2O$, or a gas still having a reducing power, such as CO or $H_2$, like in the case of a controlled combustion of hydrocarbons.

Thus, mixtures of methane and air, for instance, wherein the mole ratio of oxygen to methane is lower than 1, will be effective for carrying out a complete reduction of iron ore in the absence of a gangue, whereas in the presence of the latter said ratio must not exceed 0.5 in order to obtain the same result.

It may be of advantage in some cases, particularly when treating iron ore containing a gangue, to use hydrocarbons preheated to a high temperature, for instance above 500° C., as reducing agents. At said temperature hydrocarbons are partially or entirely cracked.

An increase of the reducing power of the applied gas may also be achieved by suspending therein finely divided particles of carbon or coke.

The lowest temperature at which the reaction may be carried out must, in any case, be sufficient for bringing the major part of the iron or of its derivatives to the liquid state. Said temperature is, therefore, dependent on the composition of the material to be treated.

Thus, for instance, when the treated material consists of an iron oxide substantially free from impurities, the temperature must be at least about 1590° C. at the beginning of the reaction and may thereafter decrease to about 1400° C. while the reaction continues.

According to our invention it is more advantageous, however, to operate under that temperature at which the treated material is entirely in the liquid state. In most cases this condition requires temperatures above 1550–1600° C. at the beginning of the reaction and still more than 1520° C. at the end of the latter, except when the iron further contains carbon in a dissolved state during the final reduction step, which would result in the lowering of the required minimum temperature for maintaining the iron in the liquid state.

The reduction of the iron ore in the liquid phase requires an important heat supply in view of bringing the reactants, ore and gases, to the reaction temperature and compensating both, the heat absorption due to the endothermic character of the reduction, and heat losses.

This heat supply may be provided by external means, through a wall, or by inner means, such as an electrical heating system passing throughout the reactants. However, these two ways of supplying heat are very costly and, therefore, we prefer, in the process of our invention, to heat by means of a controlled combustion of reducing gases and particularly of methane or other hydrocarbons used for carrying out the different steps and preferably the ultimate reducing step in the presence of oxygen or of an oxygen-containing gas, such as air, as combustion-sustaining agent. This combustion is limited in the reaction vessels to only part of the reducing gases employed, but the gases issuing from said reaction vessels, which still possess a certain reducing power, may be used for preheating the treated material.

As a consequence of this preferred method of supplying heat, not all reducing gases are considered equivalent for carrying out the process of our invention, since they are not to the same extent suitable for both reducing the iron ore in the liquid state and supplying the heat necessary for the reaction.

Thus carbon oxide and hydrogen suffer from the drawback of being partially converted by oxidation with oxygen, to carbonic gas and water, the presence of which, even in small amounts, may prevent a complete reduction of a gangue containing iron ore. On the other hand, hydrocarbons may be partially oxidized to carbon monoxide and hydrogen with heat release without substantial formation of $CO_2$ or $H_2O$.

Consequently, the use of hydrocarbons, either in the form of natural gas or of hydrocarbon vapors, is preferred.

Figure 4:
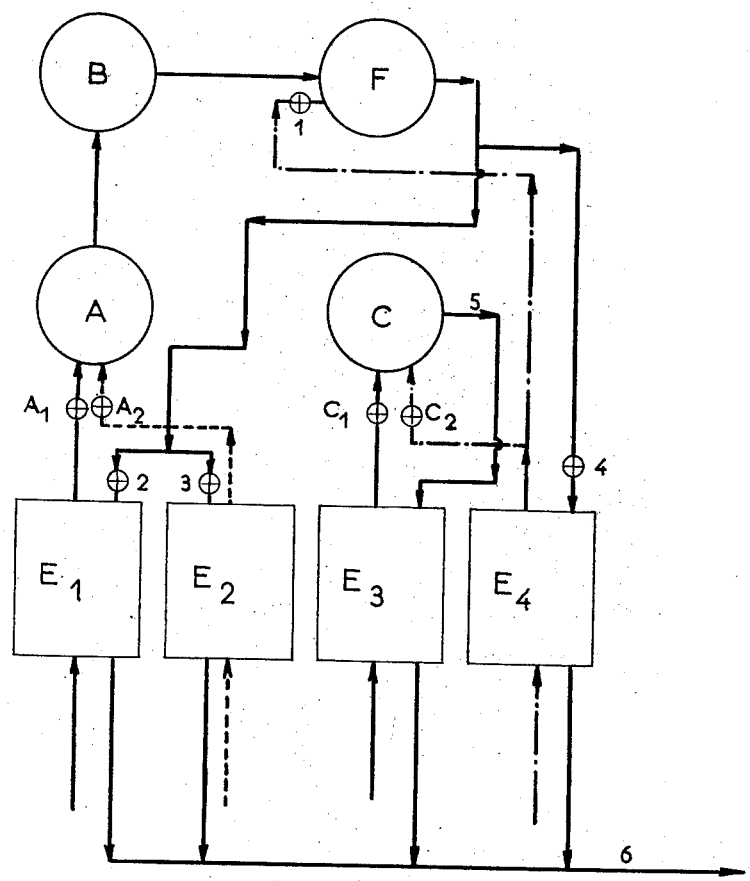

The process according to our invention may be carried out in various installations such as, for instance, those corresponding to the flow-sheets of the accompanying drawings, wherein FIGURE 1 is a flow-sheet of an arrangement according to the first, preferred embodiment of the process of our invention, comprising two successive reaction vessels in each of which a complete reduction of the iron ore is carried out;

FIGURE 2 is a flow-sheet of an arrangement according to the second embodiment of the process of this invention, comprising two successive reaction vessels, the second of which is fed with the partially oxidized gases issuing from the first one until the iron ore treated in the latter is entirely converted to iron, the iron ore treated in said second reaction vessel being thereafter transferred to the first one, whereas a new charge of iron ore is provided to said second reaction vessel;

FIGURE 3 is a flow-sheet of an arrangement comprising three successive reaction vessels for carrying out the process of this invention according to the first proposed embodiment of the same, i.e. with the three reducing steps successively carried out in each reaction vessel by successively feeding the same with gases of increasing reducing power;

FIGURE 4 is a flow-sheet of an arrangement comprising three successive reaction vessels in each of which is carried out a reducing step, at the end of which the iron ore is transferred from the corresponding reaction vessel to that one fed with reducing gases of a higher reducing power, according to the second embodiment of the invention, except for one vessel which is separately fed with reducing gas.

In order that those skilled in the art may better understand the method of our invention and in what manner the same can be effected, the following examples are given with reference to the accompanying drawings. These examples, as well as the corresponding drawings are not to be considered as limiting, in any way, the scope of our invention, since they are only given for illustrative purposes.

Values and quantities given in these examples for the various flows of solids, liquids or gases, are those corresponding to the production of one metric ton of iron, the gaseous volumes mentioned being related to normal conditions of temperature (about 20° C.) and pressure (atmospheric).

EXAMPLE I

This example, as illustrated in FIGURE 1, relates to the reduction of pure iron ores by means of natural gas (methane) in two reaction vessels A and B connected in series, according to the first embodiment of the invention hereabove referred to, the heat required for carrying out the reaction being supplied by the partially controlled combustion of the natural gas, by means of oxygen.

The iron ore, consisting of pure iron oxide $Fe_2O_3$, i.e. having an oxidation degree of 1.50, in amounts of 1.43 metric tons, is preliminarily preheated and smelted in the furnace F by contacting the same with hot gases resulting, on one hand, from the complete combustion of gases issued from one of the two reaction vessels A and B and, on the other hand, from the combustion of methane by means of oxygen, said last two gases being supplied through pipes 9 and 10, respectively.

During this preliminary smelting step the oxidation degree of the iron ore, as heretofore defined, is decreased to about 1.37. The oxidized gases resulting therefrom are conveyed through valves 7 and 8 to the heat exchangers $E_1$ and $E_2$ wherein they bring to a temperature of about 500° C. the methane delivered through pipe 11, and to a temperature of about 1000° C., oxygen being delivered through pipe 12. The burnt gases are thereafter removed through pipe 13 to a chimney.

At the beginning of the reduction cycle, about 1,392 kilograms of liquid iron oxide having an oxidation degree in the vicinity of 1.37, are introduced into the reaction vessel B.

At the same time the oxidation degree of the iron ore contained in the reaction vessel A is close to 1.01. There are thus introduced into the reaction vessel A the reducing gases resulting from the mixture of methane, preheated to 500° C., the flow of which is regulated by valve 1, with oxygen, brought to 1000° C., the flow of which is controlled by valve 2, the valve 5 being kept closed. The gases issued from the reaction vessel A pass successively through the reaction vessel B and the furnace F, the valves 3 and 4 being closed and the valve 6 opened. When 485 m.³ of methane and 290 m.³ of oxygen have thus been introduced into the reaction vessel A, resulting in the formation of 1455 m.³ of gases which are then passed through reaction vessel B and furnace F, the iron ore contained in the reaction vessel A is completely converted to iron (oxidation degree of zero) and the oxidation degree of the iron ore contained in the reaction vessel B is simultaneously decreased from 1.37 to 1.01, thus achieving the first reducing cycle.

Introduction of gases is then stopped and one metric ton of liquid iron is withdrawn from the reaction vessel A, into which there are then introduced 1,392 kilograms of non-reduced iron oxide having an oxidation degree of 1.37. Methane and oxygen are then introduced through valves 3 and 4 into the reaction vessel B, while valves 1, 2 and 6 are closed and valve 5 is opened; and after issuing from B pass successively through A and F.

During this cycle there are introduced into B the same amounts of methane and oxygen as are introduced into A during the preceding cycle, i.e. 485 m.³ and 290 m.³, respectively. After having withdrawn the liquid iron from the reaction vessel B, fresh iron oxide having an oxidation degree of 1.37 is again introduced into the latter. At the same time the oxidation degree of the iron ore contained in the reaction vessel A is close to 1.01 and the conditions are consequently the same as originally described, so that a new reduction cycle would again result in the production of one metric ton of iron from the treatment of 1.43 metric tons of iron oxide by means of 485 m.³ of methane and 290 m.³ of oxygen.

Comparatively speaking, the production of one metric ton of iron in a single stage process would have required 557 m.³ of methane and 343 m.³ of oxygen.

EXAMPLE II

This example, as illustrated in FIGURE 2, relates to the reduction of pure iron oxides by means of natural gas (methane) in two reaction vessels A and B connected in series, according to the second embodiment of the process of the invention, as hereabove described. The required amounts of heat necessary for carrying out the reaction are supplied by the partial combustion of methane in the presence of air used as a combustion-sustaining agent.

During the various reducing cycles the smelting is effected in the furnace F by means of the heat provided both by the gases issued from the reaction vessel B and by the combustion of methane in air, the respective flows of which are regulated by means of valves 3 and 4. The smokes pass through valves 5 and 6 to the heat exchangers $E_1$ and $E_2$ at the outlet of which they are evacuated through pipe 7. Methane and air are delivered through pipes 8 and 9.

At the beginning of a reducing cycle, the reaction vessel A is fed with iron ore having an oxidation degree of 1.01, whereas the reaction vessel B is fed with 1.392 metric tons of an iron oxide having an oxidation degree of 1.37. There are further introduced into the reaction vessel A 860 m.³ of methane, preheated to 500° C. and 3,195 m.³ of air, preheated to 1000° C., the two respective gaseous flows being kept proportional to one another by means of valves 1 and 2; the gases issuing from A (5,136 m.³) pass through the reaction vessel B and are then forwarded to the furnace F. When these amounts of gases have been introduced, the reducing cycle is complete and the reaction vessel A contains iron metal, whereas the oxidation degree of the iron oxide in the reaction vessel B has been reduced from 1.37 to 1.01.

The reaction vessel A is then emptied and the iron oxide of an oxidation degree of 1.01 is transferred from the reaction vessel B to the reaction vessel A, the former being thereafter charged with 1,392 kilograms of iron oxide having an oxidation degree of 1.37. Conditions are thus identical with those at the beginning of the preceding reducing cycle and one metric ton of liquid iron metal is produced by reducing 1.43 metric tons of iron oxide by means of 860 m.³ of methane and 3,195 m.³ of air.

Comparatively speaking, the production, under the same general conditions, of one metric ton of iron, in a single-stage process would have required 930 m.³ of methane and 3,530 m.³ of air.

EXAMPLE III

This example, as illustrated in FIGURE 3, relates to the reduction by means of natural gas, of an impure ore of the type of the Tindouf iron ore, having the respective contents:

79.4% of $Fe_2O_3$, 6.2% of $SiO_2$, 0.1% of $Mn_2O_3$, 6.4% of $Al_2O_3$, 1.38% of $P_2O_5$, 0.9% of CaO, 4.1% of $H_2O$ and 1.52% of various impurities.

125 kilograms of lime, used as flux, are added to 1,800 kilograms of that iron ore.

The reduction is carried out in a unit comprising three reaction vessels A, B and C and a furnace F, the reducing cycle being effected in three successive steps, one in each reaction vessel. During one cycle the first reducing step, resulting in the decrease of the oxidation degree of the iron ore from 1.37 to 1.01, is carried out in a first reaction vessel, for instance A, whereas a second reducing step, bringing the oxidation degree of the iron ore down from 1.01 to 0.76, is effected in a second reaction vessel, for instance B; the ultimate reducing step, providing for the decrease of the oxidation degree from 0.76 to 0, being carried out in the third reaction vessel, for instance C.

However, the three reduction steps are carried out successively in each reaction vessel so that the iron ore has not to be transferred from one reaction vessel to another one during the complete reduction cycle.

According to the present example, two of these three reaction vessels are fed with the same gas, whereas the third reaction vessel, wherein is carried out the first reducing step, as hereabove defined, is fed separately.

FIGURE 3 shows three interchangeable reaction vessels A, B and C provided with identical pipes and valves which are, consequently, designated with the same numerical indices. Valves $A_1$, $B_1$ and $C_1$ control the flow of methane cracked at 1000° C., delivered through pipes 7 and 8 to the reaction vessels A, B and C; valves $A_2$, $B_2$ and $C_2$ control the supply of methane at 500° C. through pipes 9 and 10; valves $A_3$, $B_3$ and $C_3$ control the supply of oxygen at 1000° C. through pipes 11 and 12, valves $A_4$, $B_4$ and $C_4$ control the transfer of reducing gases, at 1600° C. from one reaction vessel to another, valves $A_5$, $B_5$, $C_5$ control the transfer of gases from the corresponding reaction vessel to the furnace F, and valves $A_6$, $B_6$ and $C_6$ control the transfer of combustible gases from the corresponding reaction vessel to the heat exchanger $E_1$, through pipes 14 and 15. Exchangers $E_1$ and $E_2$ are fed with methane through pipe 17 and exchanger $E_3$ is fed with oxygen through pipe 18. Exchanger $E_1$ is heated by combustion with air, delivered through pipe 16 of gases supplied by pipe 15. Exchangers $E_2$ and $E_3$ are heated by means of gases issued from furnace F and distributed through valves 19 and 20. The cold gases, issuing from the three exchangers are evacuated by chimney 13.

During a first reducing cycle, the oxidation degree of the iron ore contained in the reaction vessel A drops from 0.76 to 0, that of the iron ore of B from 1.01 to 0.76 and that of the iron ore of C from 1.37 to 1.01.

The various operating conditions for carrying out the three reducing steps in the three reaction vessels A, B and C are summarized in Table I, below:

Table I

| Operating characteristics | Reaction Vessel A | Reaction Vessel B | Reaction Vessel C |
| --- | --- | --- | --- |
| Initial oxidation degree | 0.76 | 1.01 | 1.37 |
| Final oxidation degree | 0 | 0.76 | 1.01 |
| Opened valves | 1,3,4 | 5 | 2,3,6 |
| Closed valves | 2,5,6 | 1,2,3,4,6 | 1,4,5 |
| Consumption of methane (to be cracked at 1000° C) m.³ | 330 | | |
| Consumption of methane at 500° C m.³ | | | 80 |
| Volume of gas at 1,600° C m.³ | | 990 | |
| Consumption of oxygen at 1,000° C m.³ | 129 | | 63 |

It is thus apparent that the residual gases, issued from the reaction vessel A, brought to 1600° C., pass throughout the reaction vessel B and are evacuated through pipe 14, whereas the reaction vessel C is separately fed with methane and oxygen.

During a second cycle, the same operations are carried out but in different reaction vessels. The corresponding operating characteristics may be easily deduced from Table I by replacing in the latter the references to reaction vessel A, reaction vessel B and reaction vessel C by the respective references to reaction vessel B (first column), reaction vessel C (second column) and reaction vessel A (third column).

The operating characteristics during a third cycle are also those shown in Table I wherein figures of the first column refer to reaction vessel C, the second column to reaction vessel A and the third to reaction vessel B.

The fourth cycle is identical with the first one, the fifth with the second one and so forth.

EXAMPLE IV

Example III is repeated except that the reaction vessel wherein the oxidation degree is reduced from 1.37 to 1.01 (reaction vessel C in the first cycle) is replaced by two reaction vessels fed in series with methane at 500° C. and oxygen at 1000° C. The methane and oxygen consumptions during this step are about 60 m.³ and 48 m.³ respectively, as compared to consumptions of 80 m.³ of methane and 63 m.³ of oxygen, when using a single reaction vessel according to Example III.

EXAMPLE V

This example relates to the reduction, by means of natural gas, of the same iron ore as described in Example III, said reduction being carried out in three reaction vessels fed with the same gaseous stream. The arrangement of apparatus used is the same as shown by the flow sheet of FIGURE 3 except that exchanger $E_1$, is suppressed as well as all pipes and valves connected thereto more or less directly, i.e. pipes 9, 10, 14, 15 and 16 and valves $A_2$, $B_2$, $C_2$, $A_6$, $B_6$, $C_6$.

During the first reducing cycle, the various operating characteristics are summarized in Table II below.

Table II

| Operating Characteristics | Reaction vessel A | Reaction vessel B | Reaction vessel C |
| --- | --- | --- | --- |
| Initial oxidation degree | 0.76 | 1.01 | 1.37 |
| Final oxidation degree | 0 | 0.76 | 1.01 |
| Opened valves | 1,3,4 | 4 | 5 |
| Closed valves | 5 | 1,3,5 | 1,3,4 |
| Consumption of methane (to be cracked at 1,000° C.) m.³ | 330 | | |
| Volume of gas at 1,600° C. m.³ | | 990 | 990 |
| Consumption of oxygen at 1,000° C. m.³ | 129 | | |

The sequence of cycles is the same as in Example III. There is thus obtained at each cycle one metric ton of liquid iron with a consumption of 330 m.³ of methane (corresponding to 660 m.³ of cracked methane) and of 129 m.³ of oxygen.

EXAMPLE VI

Example II is repeated with iron ore from Tindouf as described in Example III.

At the beginning of a cycle, the reaction vessel A is supplied with iron ore having an oxidation degree of 0.83 whereas the reaction vessel B is charged with 1,800 kg. of iron ore having an oxidation degree of 1.37.

There are introduced simultaneously into the reaction vessel A, 137 m.³ of oxygen at a temperature of 1000° C. and the gases resulting from the cracking, at about 1000° C., of 350 m.³ of methane.

At the end of the cycle, the reaction vessel B contains iron ore having an oxidation degree of 0.83, which is then transferred to the reaction vessel A after having withdrawn the liquid iron therefrom.

EXAMPLE VII

This example, as illustrated by FIGURE 4, relates to the reduction, by means of natural gas of an iron ore of the same type as that described in Example III, said reduction being carried out according to the second embodiment of the process of our invention as hereabove described, i.e. comprising the transfer of the liquid iron ore from one reaction vessel to another one at the end of each reducing cycle.

At the end of a cycle the reaction vessel A which contains pure iron and dross (i.e. material whose oxidation degree is substantially nil) is emptied, thereafter charged with the iron ore contained in the reaction vessel B (having an oxidation degree of 0.76), the iron ore contained in the reaction vessel C (having an oxidation degree of 1.01) is transferred to the reaction vessel B, fresh smelted iron ore (having an oxidation degree of 1.37) issuing from the furnace F, is charged into the reaction vessel C and 1,800 kg. of solid iron ore together with 125 kg. of lime are forwarded per cycle to said furnace.

There are then introduced into the reaction vessel A methane cracked at 1000° C. in exchanger $E_1$, in amounts of 660 m.³ corresponding to 330 m.³ of methane, the flow of said cracked methane being controlled through valve $A_1$; in addition, oxygen is introduced at 1000° C. issuing from exchanger $E_2$, in amounts of 129 m.³, the feeding rate of which is controlled through valve $A_2$. The gases issuing from the reaction vessel A (990 m.³) pass through the reaction vessel B and are burnt in the furnace F by means of air, the flow of which is controlled through valve 1. The hot gases issuing from the furnace pass through the exchangers $E_1$, $E_2$ and $E_4$, the valves 2, 3 and 4 being opened.

Simultaneously there are introduced into the reaction vessel C, methane brought to 500° C. in exchange $E_3$, the feeding rate of which is controlled through valve $C_1$ and air brought to 1000° C. in exchanger $E_4$, the flow of which is regulated by means of valve $C_2$. The hot gases issuing from the reaction vessel C through pipe 5 are burnt in the presence of air in exchanger $E_3$.

The cold gases issuing from the four exchangers are conveyed to chimney 6.

When the cycle is completed conditions are again the same as initially.

It will be understood that this invention is susceptible to further modification and, accordingly, it is desired to comprehend such modifications within this invention as may fall within the scope of the appended claims.

What we claim is:

1. A process for reducing iron ores in the liquid state by means of reducing gases, said iron ores containing oxygen and iron atoms, comprising a first stage of bubbling reducing gases through said iron ores in a smelted state in at least one reducing step during which the ratio of the number of oxygen atoms to the number of iron atoms in the combined form in the iron ores is gradually reduced down to a value comprised between 0.7 and 1.2 and a second stage of bubbling oxygen and reducing gases the major part of which consists of methane, through the liquid iron ores obtained at the end of the first stage, in at least one reducing step, the molar ratio of oxygen to methane being at most 1.0, thereby converting said ores to liquid iron, and withdrawing the resulting liquid iron, at least one reducing step of an iron ore of a certain oxidation degree being carried out by means of the partially oxidized reducing gases having already reduced an iron ore of a lower oxidation degree in another concomitant reducing step.

2. A process according to claim 1, wherein the iron ore treated consists of substantially pure iron oxide and the oxidation degree of said ore is reduced down, during the first stage to a value in the range of from 1.01 to 1.10.

3. A process according to claim 1, wherein the iron ore treated contains an appreciable amount of gangue and the oxidation degree of said ore is reduced, during the first stage, to a value in the range of from 0.75 to 1.1.

4. A process according to claim 1, wherein air is used as an oxygen-supplier.

5. A process according to claim 1, wherein the treated iron ore contains a substantial amount of gangue, and oxygen is introduced during the last reducing step, in a molar amount at most equal to one half of that of methane.

6. A process for reducing iron ores in the liquid state by means of reducing gases, said iron ores containing oxygen and iron atoms, comprising a first stage of bubbling reducing gases through said iron ores in a smelted state in at least two successive reducing steps during which the ratio of the number of oxygen atoms to the number of iron atoms in the combined form in the iron ores is gradually reduced down to a value comprised between 0.7 and 1.2 and a second stage of bubbling oxygen and reducing gases the major part of which consists of methane, through the liquid iron ores obtained at the end of the first stage, in at least one reducing step, the molar ration of oxygen to methane being at most 1.0, thereby converting said ores to liquid iron, and withdrawing the liquid iron, at least one reducing step of an iron ore of a certain oxidation degree being carried out by means of the partially oxidized reducing gases having already reduced an iron ore of a lower oxidation degree in another concomitant reducing step.

7. A process according to claim 6, wherein the second stage is carried out in at least two successive reducing steps.

8. A process according to claim 6, wherein at least two successive reducing steps are carried out in the same reaction vessel by means of reducing gases of increasing reducing power for said successive steps.

9. A process according to claim 6, wherein all of the successive reducing steps are carried out in the same reaction vessel, by using reducing gases the reducing power of which is higher for each step than for the preceding one.

10. A process according to claim 6, wherein at least two successive steps of reduction are each carried out in a separate vessel and the reaction vessel containing the iron ore of the higher oxidation degree is fed with the reducing gases having already carried out the reduction in the other reaction vessel.

11. A process for reducing iron ores in the liquid state by means of reducing gases, said iron ores containing oxygen and iron atoms, comprising a first stage of bubbling reducing gases through said iron ores in a smelted state in at least two successive reducing steps during which the ratio of the number of oxygen atoms to the number of iron atoms in the combined form in the iron ores is gradually reduced down to a value comprised between 0.7 and 1.2 and a second stage of bubbling oxygen and reducing gases the major part of which consists of methane, through the liquid iron ores obtained at the end of the first stage, in at least one reducing step, the molar ration of oxygen to methane being at most 1.0, thereby converting said ores to liquid iron, and withdrawing the liquid iron, the final step being carried out by means of fresh reducing gases and each of the other steps by means of the residual partially oxidized reducing gases from the following step.

12. A process according to claim 11, wherein the reducing steps to which is submitted a given charge of iron ore, are carried out in each reaction vessel successively.

13. A process for reducing iron ores in the liquid state by means of reducing gases, said iron ores containing oxygen and iron atoms, comprising a first stage of bubbling reducing gases through a batch of molten iron ores contained in a reaction vessel, in at least one reducing step during which the ratio of the number of oxygen atoms to the number of iron atoms in the combined form in the iron ores is gradually reduced down to a value comprised between 0.7 and 1.2, a second stage of at least one step of bubbling oxygen and reducing gases the major part of which consists of methane, through the liquid iron ores obtained at the end of the first stage in said reaction vessel, the molar ration of oxygen to methane being at most 1.0, thereby converting said ores to liquid iron, and withdrawing the resulting liquid iron, and another identical second stage of reduction to liquid iron of another batch of liquid iron ores, carried out concomitantly with said first stage, in a second reaction vessel, said reducing gases for carrying out said first stage being residual partially oxidized reducing gases issuing from said second reaction vessel.

References Cited in the file of this patent

UNITED STATES PATENTS 1,796,871     Madorsky             Mar. 17, 1931